May 24, 1960 A. W. SCHAFER 2,938,161
MAGNETO IGNITION SYSTEM TESTER
Filed Dec. 30, 1955 2 Sheets-Sheet 2
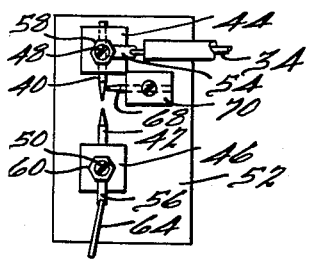
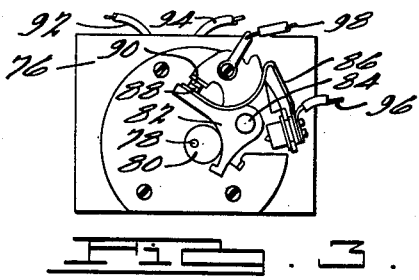
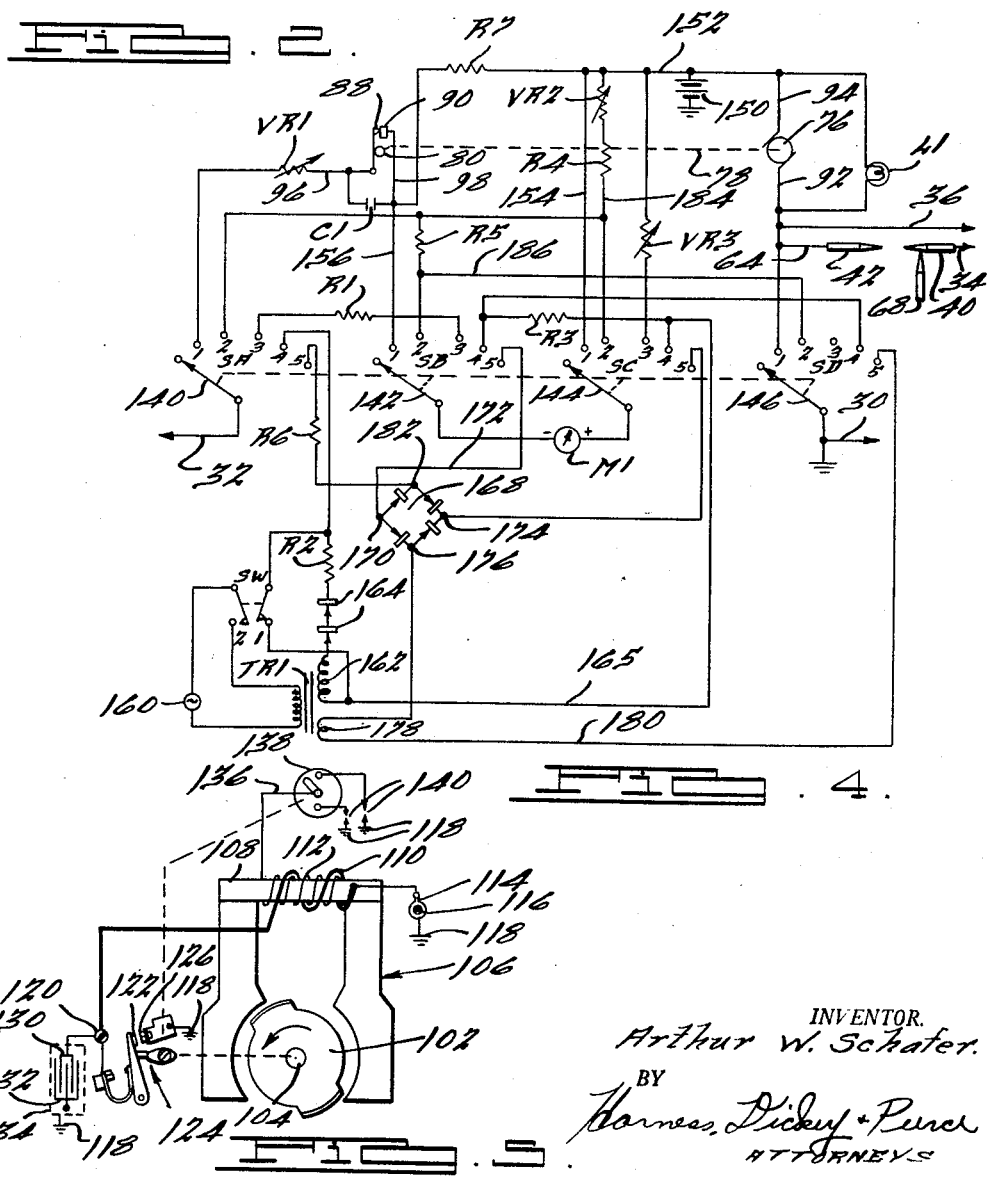
INVENTOR.
Arthur W. Schafer.
BY
Harness, Dickey & Pierce
ATTORNEYS United States Patent Office 2,938,161
Patented May 24, 1960

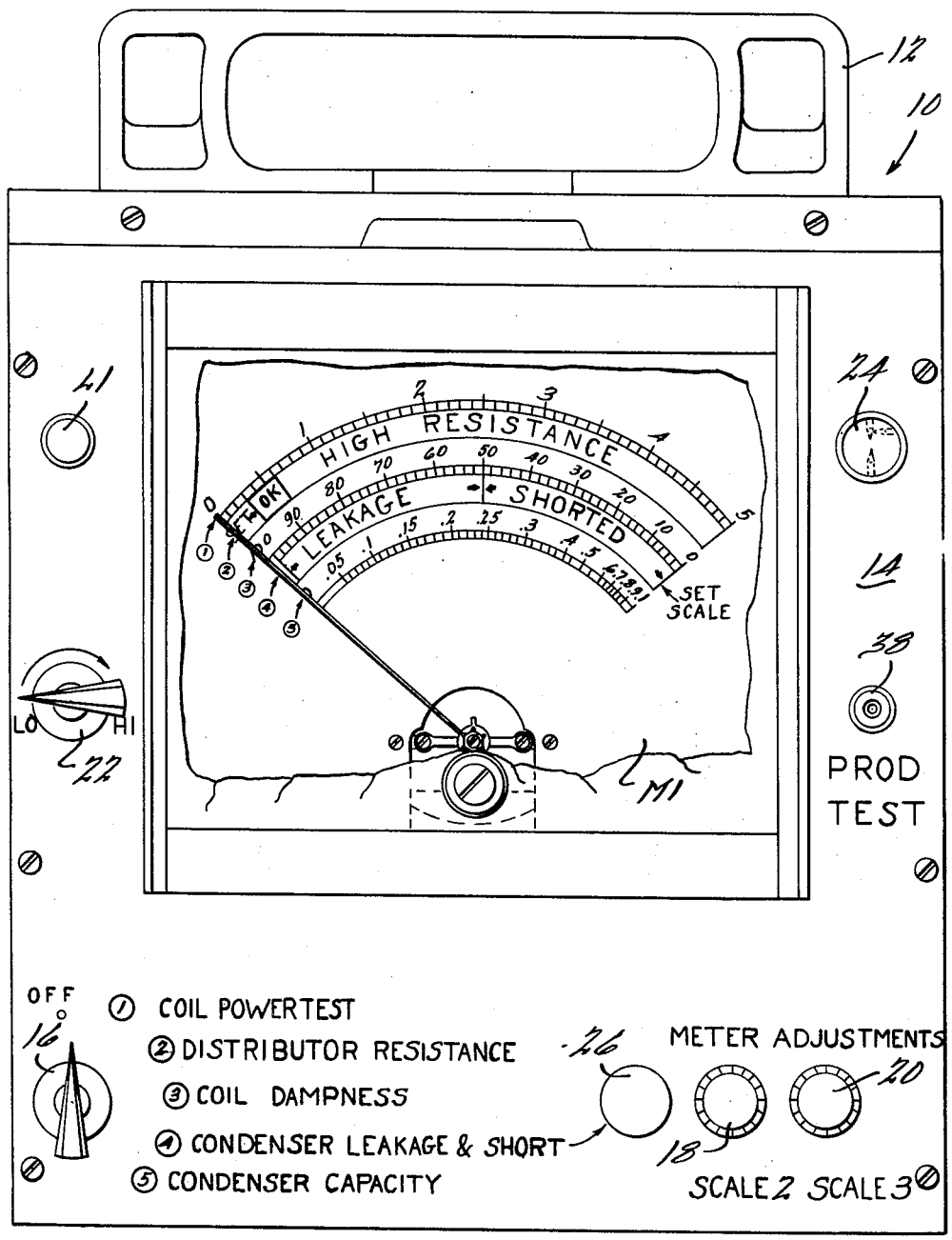

2,938,161

MAGNETO IGNITION SYSTEM TESTER

Arthur W. Schafer, Almont, Mich., assignor to Merc-O-Tronic Instruments Corporation, Almont, Mich., a corporation of Michigan Filed Dec. 30, 1955, Ser. No. 556,531

9 Claims. (Cl. 324—15)

This invention relates to testers and more particularly, to means for testing the magneto ignition systems of internal combuston engines.

In current practice, magneto ignition systems are utilized with internal-combustion power plants which are not provided with battery-generator sets. In such systems, the engine imparts relative rotational motion to a permanent-magnet field and an armature structure. At the present time it is customary to fix the armature structure relative to the body of the engine and to rotate the permanent-magnet field relative thereto.

The armature assembly includes a primary winding and one or more secondary windings, one terminal of each of the windings being grounded to the magneto frame. The other terminal of the primary winding is connectable to ground through a pair of spring-biased, cam-actuated interrupter contacts shunted by a capacitor, while the other terminal of each secondary winding is connected to ground through a spark plug or through a plurality of spark plugs and a distributor.

The failure of such systems properly to operate, though properly designed, may arise from a number of causes including defective insulation at any point in the system, high resistance in the primary circuit, defective breaker points or a defective breaker-point spring, fouled spark plugs, incorrect timing, a leaky, open, shorted or improper sized capacitor, or improper resistance of either of the windings resulting from dampness, shorted turns, an open winding, or a ground to the frame.

Various arrangements have heretofore been devised for testing magneto ignition systems for at least certain of the aforesaid defects, and it is to the improvement of such testers that the present invention is directed.

An object of this invention is to test each of the electrical elements of a magneto ignition system for each of its possible defects, and to decrease the time required for such testing.

Another object of this invention is to simplify, to increase the portability and to reduce the cost of manufacture of magneto ignition testing devices.

Another object of this invention is to test magneto ignition systems under conditions as closely as possible simulating the actual operating conditions of the systems.

The manner of accomplishing the aforesaid objects, and other objects of the invention, may be perceived from the following detailed description of an embodiment of the invention when read with reference to the accompanying drawings in which:

Figure 1 is a perspective view of a test instrument embodying the principles of the present invention;

Fig. 2 is a view of a spark gap assembly, a constituent element of the tester represented in Figure 1;

Fig. 3 is an elevational view of a motor and breaker-point assembly, a constituent element of the tester represented in Figure 1;

Fig. 4 is a schematic representation of the circuitry of the tester of Figure 1; and, Fig. 5 is a schematic representation of a type of magneto ignition assembly suitable for testing by the test instrument of Figure 1.

The tester, as represented in Figure 1 of the drawings, is a highly compact, portable instrument entirely self-contained except for the requirement for connection to a source of line power for one series of the tests. The instrument comprises a case 10 provided with a carrying handle 12 and a front panel 14 upon which the several control and indicating devices are disposed.

Among the controls is included a selector switch operated by a knob 16 having six positions, one of which is an off position, and the other five of which are operative positions to set the instrument to a selected one of a plurality of test arrangements. The meter M1, on panel 14, is provided with five scales, numbered one to five, correlatable with the Nos. 1 to 5 operative positions of the selector switch knob 16. Control knobs 18 and 20 control variable resistors, as will be seen, to adjust the zero position of the needle of the meter M1 on the second and the third scales of that meter, respectively. Control knob 22 also controls a variable resistor, the function of which is selectively to vary the amplitude of the current through the primary winding of the magneto ignition coil to accord with the manufacturer's specifications as to that current for each of the diverse types of coils commercially available. The operating characteristics of the magneto ignition system under test may be observed, under operating conditions, through the transparent window 24, providing a view of a spark gap unit to be described. Depressable button 26 controls a switch which is employed in the representative arrangement, only during that one test, at the No. 4 position of selector knob 16, in which the external source of power is required. Pilot light L1 is effective when selector knob 16 is in its No. 1 position and denotes that battery power is being applied to a motor internal of the tester.

Four test leads, terminating in appropriate prod points or clips, are or may be employed with the instrument, including two low-voltage test leads and a high-voltage test lead. Additionally, a further test lead may be plugged into jack 38 on the face of the panel 14 and is employable to detect leaky insulation conditions in the apparatus under test.

In its representative form as disclosed, the spark gap assembly viewable through the transparent window 24 comprises a pair of spaced-apart coaxial pointed electrodes 40 and 42 (Fig. 2) slidably supported in individual support blocks 44 and 46. The selected inter-electrode spacing, once established, is fixed by means such as setscrews 48 and 50 threadedly engaging support blocks 44 and 46, respectively, and adapted to bear against the electrodes 40 and 42, respectively. In a pragmatic embodiment of the invention, the inter-electrode spacing is five millimeters. Support blocks 44 and 46 are rigidly supported upon a base plate 52 adapted to be secured, in any appropriate fashion, to the inner face of the front panel 14 of the test instrument case. Terminals 54 and 56 are held in engagement with setscrews 48 and 50, respectively, by means of nuts 58 and 60, conductors 34 and 64 being electrically integral with terminals 54 and 56, respectively. Preferably, a teaser point 68, adjustably mounted in support block 70, is disposed in engagement with one of the electrodes, such as electrode 40, to assist in the initiation of a discharge across the interelectrode gap.

To simulate operating conditions during tests, as will be seen, means are provided for supplying an interrupted direct voltage to the primary winding of the magneto ignition system under test. This means includes a motor-breaker-point assembly, a representative form of which is illustrated in Fig. 3 of the drawings. A small motor 76, representatively operative from a direct current, six-volt source, is provided with a shaft 78 to which a cam 80 is secured. Cam follower 82, pivotally mounted at 84 is biased into engagement with the cam 80 by means including leaf spring 86 and carries a movable contact element 88. Upon the rotation of the shaft 78, movable contact element 88 is periodically brought into engagement with and disengaged from a fixed contact element 90 in the manner well known in the art. Power is supplied to the motor through conductors 92 and 94 while the moving and fixed contact elements 88 and 90 are connectable in the test circuit by means including conductors 96 and 98, respectively.

The test circuitry shown in Fig. 4 may be associated, by means of test prods 30 to 36, with substantially any magneto ignition system, a portion of one typical type of which is schematically represented in Fig. 5 of the drawings. That representative magneto ignition system comprises a field structure 102 rotatable by shaft 104 relative to the armature frame assembly 106, which includes a core 108. One terminal of the primary winding 110 and one terminal of the secondary winding 112, both of which windings are wound on the core 108, are connected to one another and to a terminal lug 114. A screw terminal 116 electrically connects terminal lug 114 to the ignition system ground 118, that reference potential normally being that of the frame 106. The other terminal of the primary winding 110 is connected, usually via a terminal lug, to a screw terminal 120 which is also electrically integral with the moving contact 122 of cam-actuated breaker-point assembly 124. Contact 122 is intermittently mateable with fixed contact 126 which is connected to the ignition system ground 118. The contacts 122 and 124 are shunted by a capacitor, the function of which is to protect the contacts and momentarily to store the spark energy resulting from the collapse of the field of the primary winding 110 and feed that energy back to the primary winding in the form of an oscillatory discharge. This capacitor representatively comprises an electrode assembly 130 connected to screw terminal 120 and an electrode assembly 132 connected to the capacitor case 134 which is connected to the ignition system ground 118.

The other terminal of the secondary winding 112 is connected via conductor 136 either directly to a single spark plug or by way of a distributor assembly 138 to a plurality of spark plugs 140, each of which has a terminal connected to the ignition-system ground 118.

The nature and operation of the electrical circuitry of Fig. 4 will be described in the preferred testing sequence.

In performing the tests, it is not necessary to remove the magneto assembly from the engine or to in any manner disassemble the magneto assembly except that in certain of the tests an insulating element, such as a piece of paper, is interposed the breaker points 122 and 126 (Fig. 5) and except that the terminal lug 114 is removed from the screw terminal 116 in certain of the tests.

The first test performed in the preferred sequence of testing is that of coil performance. In general, this test comprises the passing of an interrupted direct current through the primary winding of the coil under test and observing the arc formed between the spark gap electrodes 40 and 42. The arc should be strong and steady. If the spark is faint, the test tends to demonstrate that the coil is defective, although the remainder of the tests should be completed to establish the conclusion definitely. For each coil under test, information may normally be obtained from the manufacturer as to the proper operating amperage of the primary winding, and during this test that selective amperage is applied through the primary winding. These normal operating amperages tend to run in the order of somewhat under an ampere to several amperes.

The selector switch 16 (Fig. 1) controls a six position, four pole switch including sections SA, SB, SC and SD (Fig. 4). The movable brushes or wipers 140, 142, 144 and 146 of sections SA to SD, respectively, are mechanically ganged and move in unison over their respective fixed terminals. The wipers 140 to 146 are shown in their zero or off position. To perform the first test, the wipers 140 to 146 are moved, by knob 16, to their No. 1 positions. In this position of the selector switch, the positive terminal of an internally contained battery 150 is connected via conductors 152 and 154 to the No. 1 terminal of selector switch section SC, through wiper 144, meter M1, wiper 142 and the No. 1 terminal selector switch section SB, to conductor 156. Conductor 156 is connected via conductor 98 to the fixed contact 90 of the breaker-point assembly illustrated in Fig. 3 of the drawings. Contact 90 is intermittently engaged by contact 88 which is connected via conductor 96, variable resistor VR1, and through the No. 1 terminal and wiper 140 of selector switch section SA to the test probe 32.

Contacts 88 and 90 are shunted by capacitor C1 which is the internal counterpart of the capacitor 134 in the equipment under test.

The negative pole of battery 150 constitutes the "ground" reference potential of the test instrument and need not either be connected to the chassis of the test instrument or be the same reference potential as reference potential 118 in the instrument under test, as represented in Fig. 5. This negative reference potential, hereinafter referred to as the test instrument ground, is also connected to the test lead 30.

Test leads 30 and 32 are connected to the ignition system under test so that an appropriate current is applied through the primary winding thereof even though the field structure 102 not be rotated. Thus, an insulator is placed between contacts 122 and 126, test lead 32 is clipped to or otherwise rendered electrically integral with screw terminal 120, terminal lug 114 is disconnected from screw terminal 116, and test lead 30 is connected to terminal lug 114. The current through the primary winding 110 of the system under test is then adjusted to the manufacturer's specification by varying variable resistor VR1 (Fig. 4) under the control of knob 22 (Fig. 1). This current is periodically interrupted by the opening of contacts 88 and 90 as a result of the rotation of cam 80 by motor 76, the energizing circuit for motor 76 being completed from the battery 150 through conductor 94, motor 76, conductor 92, and through the No. 1 terminal and wiper 146 of the selector switch section SD to the test instrument ground. The proper amplitude of this current is adjusted by viewing the No. 1 scale of the meter M1 which is calibrated, for example, from 0 to 5 amperes. Since a meter of substantial sensitivity is desirable for certain others of the test, a meter M1 providing a full-scale deflection with a much smaller current than 5 amperes is preferably employed, with a resistor R7 being connected in shunt of meter M1, the shunt connection comprising wiper 144 and terminal No. 1 of switch section SC, conductor 154, resistor R7, conductor 156, No. 1 terminal and wiper 142 of switch section SB and back to the meter. In a pragmatic embodiment of the invention, a low internal resistance meter M1 is employed capable of providing, with no shunts, full-scale deflection with a one-milliampere current therethrough. Consequently, for a five-ampere scale, resistor R7 must present a resistance approximately one five-thousandths of the internal resistance of meter M1 so that its value will be very small.

In order that the operation of the coil under test may be observed, test lead 34 (Fig. 4) is connected to the output of the secondary winding 112 (Fig. 5). Thus, test probe 34 may be touched to conductor 136, to the motor of distributor 138 or to any of the output terminals of the distributor 138 or the high-voltage electrodes of any of the spark plugs 140, so long as the rotor of distributor 138 is appropriately oriented. In practice, the rotor 138 may be moved into successive electrical engagement with the several spark plugs, with the test lead 34 being connected to the successive ones of those spark plugs. As a result of this connection, the high voltage periodically appearing upon test probe 34 is discharged to the test instrument ground via spark gap electrodes 40 and 42 and through the No. 1 contact and wiper 146 of the selector switch section SD, it being recalled that test instrument ground potential is applied via test lead 30 to the other terminal of the secondary winding 112 of the coil under test. As noted, the character of the spark is observed through the transparent window 24 (Fig. 1). If desired, the variable resistor VR1 may then be reduced in resistance to apply increasing currents through the primary winding of the coil under test to observe the operation of that coil under high speed operation, to make certain that the coil, if properly operative at normal speeds, is not defective at high speeds.

Since both the primary and secondary windings, as well as the distributor and the spark plug wires, are under normal operating voltages or above, the existence of cracked or otherwise defective insulation may be perceived by moving a grounded test probe adjacent the surfaces of the insulation and observing if a spark occurs between that test probe and any part of the ignition system through the ignition system insulation. Probe 36 is, under the instant setting of the selector switch, connected to the test instrument ground through the No. 1 terminal and wiper 146 of selector switch section SD so as to facilitate the performance of this test.

In the second test in the preferred sequence of testing, the selector switch including sections SA to SD is switched to its No. 3 position, that is, to the position in which the wipers 140 to 146 are in engagement with their No. 3 terminals. In this position appropriate circuitry is established for testing the effective resistance of the secondary winding of the coil under test, so as to perceive whether there is a discontinuity in that winding, whether the secondary winding is damp, or whether there are internal short circuits within that winding. In this test, the test lead 30 is left connected to terminal lug 114, lead 34 is disconnected and not employed, and lead 32 is connected to an appropriate point on the coil secondary such as at a point on conductor 136, distributor 138 or the high-voltage electrodes of the spark plug or plugs 140. The points 122 and 126 are held open as before.

With the selector switch in its No. 3 position, a circuit is then completed from the positive terminal of battery 150, conductor 152, variable resistor VR3, No. 3 terminal and wiper 144 of selector switch section SC, through the meter M1, wiper 142 and No. 3 terminal of selector switch section SB, resistor R1, No. 3 terminal and wiper 140 of selector switch section SA, lead 32, through the secondary winding 112 of the magneto ignition system under test (Fig. 5), terminal lug 114, and via conductor 30 to the test instrument ground at the negative terminal of battery 50. Thus, a series circuit is established, the total resistance of which, apart from the internal resistance of meter M1 and of battery 150 and apart from any resistance contributed by the selector switch contacts, consists of variable resistor VR3, resistor R1 and the resistance of the secondary winding of the coil under test. Variable resistor VR3 is provided to permit zeroing of the meter M1 precedent to the subject test. This zeroing is accomplished, preliminary to the connection of the test leads 30 and 32 to the ignition system under test, by interconnecting test leads 30 and 32 and adjusting variable resistor VR3 until the needle of meter M1 reads zero on the No. 3 scale which, it will be noted by reference to Fig. 1 of the drawings, is at the full deflection position of the needle. As a consequence, when test leads 30 and 32 are reconnected as described across the secondary winding of the coil under test, if the resistance of that coil is zero, then meter M1 will again read zero on scale No. 3. At any finite value of resistance of the secondary winding of the ignition coil under test, the current in the series circuit will be accordingly limited and the meter M1 will show less than full deflection. The change is rectilinear so that scale No. 3 may be rectilinearly calibrated in ohms, increasing in a counter-clockwise direction. Obviously, the values of resistor R1 and variable resistor VR3 are selected in view of the sensitivity and internal resistance of the meter M1 and of the value of battery 150 so as to provide a full scale deflection with the test leads clipped together at some appropriate position of resistor VR3. In the exemplary arrangement disclosed, the maximum reading of the meter is 100 ohms which is a value greater than the resistance of any commonly commercially employed magneto ignition coil secondary winding now available on the market. In most cases, the manufacturer of the ignition coil will provide information as to the maximum and minimum tolerable resistance values of the secondary windings of his coil, and the test is to determine whether the resistance falls within the stated range. Obviously, a reading lower than the manufacturer's specified minimum value is indicative that the secondary winding is damp or shorted whereas a reading greater than the maximum value specified by the manufacturer is indicative that the secondary winding has a partial or total open. In either case the coil should be replaced.

The instrument may also be employed, in the same position of the selector switch as just described, to ascertain whether any element of the coil assembly of the ignition system under test is improperly grounded to the ignition system frame. With test lead 30 remaining connected to terminal lug 114 (that terminal lug being dissociated from terminal screw 116), test lead 32 is connected to the frame 106 or some part electrically integral therewith. As a result, a series circuit is established including the variable resistor VR3, the meter M1, resistor R1, the primary and secondary windings 110 and 112 of the coil under test, in parallel with one another, and the resistance between the non-interconnected ends of those windings and the frame 106. Obviously, if the insulation between the two windings 110 and 112 and the frame 106 is as it should be, substantially no current will flow in the noted circuit and the needle of the meter M1 will be positioned at the extreme left-hand end of scale No. 3. Since the primary and secondary windings are connected in parallel, the total resistance presented by the coils themselves will be appreciably less than the 100-ohm maximum reading on scale No. 3 so that if any point of either the primary or secondary winding is grounded to the frame 106, the needle of the meter M1 will assume a position to the right of its leftmost position, indicating the existence of an improper ground at some point in the ignition system.

It is possible that the improper ground condition, if one exists, is occurring in the capacitor 134 or in the breaker-point assembly 124. Hence, without changing the position of the test leads 30 and 32 and without changing the setting of the test instrument, the lead from the primary coil 110 may be disconnected from terminal screw 120. If the indication of an improper ground disappears, it is an indication that the difficulty lies in the capacitor 134 or in the breaker-points 124. It is also possible that the improper ground condition is occurring in the distributor 138 or in one of the spark plugs 40 or wiring interconnecting those elements. Consequently, if desired, secondary lead 136 may be disconnected from distributor 138 to perceive whether the ground indication continues or terminates. Obviously, if the indication of an improper ground continues after the two described disconnections are made, the coil is defective.

In the next test in the preferred sequence of testing, the insulating element is left between the breaker-points 122 and 126 of the instrument under test, test lead 32 is left in contact with frame 106, that is, with the electrical "ground" of the ignition system under test, and test conductor 30 is removed from terminal lug 114 and connected to the terminal screw 120 to which capacitor 134 and the movable contact 122 of the breaker-point assembly 124 are connected.

The selector switch including sections SA to SD is then switched to its No. 4 position in order to test whether the capacitor 134 is either leaky or shorted. In this setting, the current through the capacitor is measured with the meter M1, the applied voltage being sufficient, in the light of the sensitivity of the meter, to provide a deflection of the meter needle if the capacitor is sufficiently leaky to adversely affect the operation of the ignition system. The pulsating direct voltage applied to the capacitor is derived from a half-wave rectified, high-amplitude alternating voltage and is selectively applied to the capacitor under test by means including a press-to-operate switch SW (Fig. 4) operated by the push button 26 (Fig. 1). Precedent to this test, the instrument is associated with a source of alternating line voltage 160 which is applied across the primary winding of transformer TR1 upon the closure of the No. 2 contact of switch SW, resulting from the depressing of button 26. This operation of switch SW also results in the opening of the No. 1 contact thereof. With the selector switch including sections SA to SD in its No. 4 position, as noted, a series circuit is completed including secondary winding 162 of transformer TR1, dry-disk rectifiers 164 (a pair of which are representatively used so that the peak-back voltage rating of either one thereof will not be exceeded), resistor R2, No. 4 contact and wiper 140 of selector switch section SA, test lead 32, magneto frame 106 (electrically integral with ignition system ground 118), the case 134 and electrode structure 132 of the capacitor under test, electrode structure 130 of that capacitor, screw terminal 120, test lead 30 (which is connected to the test instrument ground), wiper 146 and No. 4 contact of selector switch section SD, No. 4 terminal and wiper 142 of selector switch section SB, meter M1, wiper 144 and No. 4 contact of selector switch section SC, and via conductor 165 back to the other terminal of the secondary winding 162 of the power transformer TR1.

To provide the most accurate testing and to avoid the necessity of preheating the capacitor under test, it is desirable that the pulsating direct voltage applied thereacross have a substantial amplitude, in the order, for example, of 200 to 400 volts. The value of resistor R2 is appropriately selected so that the needle of the meter M1 will not be deflected if the capacitor 134 is not leaky to the point of affecting the operation of the magneto ignition system but will be deflected if that capacitor is leaky to that extent or greater.

In order to prevent the application of excessive current through the meter M1 and to provide a proper scale of operation, resistor R3 is connected in shunt of the meter M1 by connecting it between the No. 4 contacts of selector switch sections SB and SC. If the capacitor under test is not unacceptably leaky, the circuit impedance will be high, the current flow will be low, and the needle of the meter M1 will be deflected but little, if any. If the effective resistance offered by capacitor 134 is less than the desirable amount, the needle of meter M1 will be correspondingly deflected to the right, as viewed on scale No. 4 (Fig. 1). As a result, a point may be selected on that scale demarking the point of division between an acceptable and an unacceptable capacitor, as is represented on scale No. 4 on the face of the meter.

It will be noted that the primary winding of transformer TR1 is connected to the source 160 only at such time as the No. 2 contact of switch SW is closed so that when, at the termination of the test, push button 26 is released, transformer TR1 is deenergized. At this instant, the capacitor 134 under test is fully charged. Normally then, as the service man disconnects the test leads 30 and 32 he is subjected to the hazard of receiving a shock, which may be in the order of several hundred volts, from a low-impedance source. To avoid the danger arising from this condition, the No. 1 contact of switch SW is connected in shunt of the capacitor at the instant that the push button 26 is released. Thus, at the instant of release of the push button 26, a discharging circuit is established from electrode 130 of capacitor 134, screw terminal 120, test lead 30, wiper 146 and terminal No. 4 of switch section SD, terminal No. 4 and wiper 142 of switch section SB, meter M1, wiper 144 and No. 4 terminal of switch section SC (and resistor R3 in parallel with meter M1), conductor 165, through the now-closed No. 1 contact of switch SW, No. 4 terminal and wiper 140 of switch section SA and via conductor 32 back to the other side of the capacitor 134 under test. Therefore, when the service man releases the button 26 preparatory to employing both hands to disconnect the test leads from the capacitor under test, that capacitor will be automatically discharged over the traced path at such a rate that the residual charge by the time that he is able to touch the capacitor to receive a shock is insufficient to be perceptible to the touch.

Provision is also made for checking the actual capacity of the capacitor employed in the magneto ignition system since a capacitor which is either too large or too small will tend to produce improper operation of the ignition system. The test leads are left in the same position as they were for test No. 4, the breaker-points are insulated from one another, as before, and the selector switch is turned to its No. 5 position. This switching establishes a series circuit including an alternating voltage of reasonably stable amplitude, an alternating current milliammeter, a resistor of fixed value and a capacitor under test. Consequently, the deflection of the needle of the meter will reflect the total current flowing in the circuit which, with a constant voltage, is a reflection of the impedance of the circuit, that impedance in turn consisting of a preselected resistance and the capacitative reactance of the capacitor under test. As a reuslt, the meter scale may be calibrated in terms of capacitance. Since the capacitors conventionally employed in magneto ignition systems are under one microfarad in size, scale No. 5 on the face of meter has been calibrated to indicate a maximum capacitance of one microfarad, the value of the series resistor and of the input voltage being appropriately selected. Obviously, this scale may be changed if desired.

Since a direct current meter M1 is employed in the previous tests, it is necessary to provide a meter rectifier 168 to adapt the meter M1 to the present use. Meter rectifiers suitable for this use are available on the market. With the selector switch shifted to position No. 5, the meter M1 is connected across the output terminals of the full-wave bridge rectifier 168, the output circuit being traceable from output terminal 170 of rectifier 160, conductor 172, No. 5 terminal and wiper 142 of selector switch section SB, meter M1, wiper 144 and No. 5 terminal of selector switch SC to the other output terminal 174 of rectifier 168. The input circuit to meter rectifier 168 may be traced from input terminal 176, winding 178 of transformer TR1 (exemplarily a 6.3 volt filament-type winding), conductor 180, No. 5 terminal and wiper 146 of selector switch section SD, test lead 30 (at the test instrument ground potential), screw terminal 120 of the system under test (Fig. 5), capacitor 134, ignition system ground 118 to which test lead 32 is connected as noted, wiper 140 and No. 5 terminal of switch section SA, resistor R6, and to the other input terminal 182 of the instrument rectifier 168. Thus, the previously described testing circuit is established, an alternating current being applied through the capacitor under test and a direct current being applied through the meter M1, the amplitude of both currents being controlled by the capacitance of the capacitor.

The preferred sequence of operations is predicated upon the convenience of moving the test leads upon the ignition system under test and upon the necessity for providing, or removing, the insulating member between the contact points 122 and 126. The next step in that preferred sequence is to remove that insulating member from between contacts 122 and 126, for the first time in the testing operation, with both test leads 30 and 32 being left connected as last noted, that is, with the test lead 32 being connected to the frame 106, or parts electrically integral therewith, of the equipment under test, and with the test lead 30 remaining connected to screw terminal 120. In order to test for high resistance in the primary circuit, the shaft 104 (Fig. 5) is turned until the breaker points 122 and 126 are closed, and the selector switch is then shifted to its No. 2 position. The resultant switching establishes circuitry for measuring to close accuracy the resistance between the breaker points 122 and 126 resulting either from defective contacts or from a weak breaker point spring.

With the selector switch turned to No. 2 position, the positive terminal of battery 150 is connected via conductor 152, variable resistor VR2, resistor R4, and to conductor 184. Three separate return paths are established from conductor 184 to the negative terminal of battery 150. One of those paths includes the No. 2 terminal and wiper 144 of selector switch section SC, meter M1, wiper 142 and the No. 2 contact of selector switch section SB, conductor 186, the No. 2 contact and wiper 146 of selector switch section SD and to the test instrument ground. Another such path, the meter shunt path, includes conductor 184, resistor R5, conductor 186, the No. 2 contact and wiper 146 of selector switch section SD and to the test instrument ground. The final one of the three paths, the sensing path, includes conductor 184, the No. 2 contact and wiper 140 of selector switch section SA, test lead 32, which is connected to the frame 106 (Fig. 5) and hence, presumptively, to the magneto ignition system ground 118 at the stationary breaker point 126, contact 122, terminal 120 to which test conductor 30 is connected and via that lead to the test instrument ground. It will be observed that capacitor 118 is connected in shunt of the breaker point contacts 122 and 126, but the leakage characteristics of that capacitor have either already been found to be within acceptable limits or else, presumptively, the capacitor has been replaced so that its effect upon this test is of no significance.

The value of resistors R4 and VR2 are selected to provide a reasonable current amplitude through the tested breaker points. Resistor VR2 is made variable to permit zeroing of the instrument on the No. 2 scale preliminary to the subject test, an operation performed by interconnecting test leads 30 and 32 and adjusting resistor VR2, with the selector switch in its No. 2 position, until the meter needle is zeroed. The value of resistor R5 is selected in the light of the characteristics of the meter M1 and the total current which must flow therethrough or be bypassed therearound. These parameters are so selected that if the breaker points present a high resistance to current flow, substantially the entire current will flow through the meter M1 and its shunt R5, producing, for example, a full-scale deflection of the meter needle. Conversely, if the breaker point contacts are in good condition and present effectively a dead short across the meter, then, obviously, the reading of the meter will be zero. In practice, the No. 2 scale of the meter is calibrated to indicate the maximum permissible resistance presented by the breaker points which is tolerable in use, this region being denoted by the "ok" block on the No. 2 scale.

By simply moving the test lead 30 from its position in contact with terminal screw 120 to engagement with the canister of the capacitor 134, the quality of the ground connection of that canister to the magneto ignition system ground may be tested in a manner identical to that previously described in which the resistance offered by the breaker-point contact assembly 124 was measured. In a similar manner, any other ostensibly grounded point in the ignition system assembly may be checked for quality.

By virtue of the described arrangement, a complete and thorough test may be performed upon substantially any magneto ignition system to ascertain which are the defective elements and the nature of their defects. Obviously, coils with two secondaries and the testing of magneto structures of types other than that representatively shown in Fig. 5 may readily be performed in a similar fashion to that described.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In an apparatus for testing magneto ignition systems of the type having primary and secondary windings, a pair of breaker points and a capacitor, the combination of a source of energy, a current measuring device, continuously variable resistance means for adjusting the current through said primary winding, a pair of periodically opening contacts, circuit means connecting said source of energy, said device, said variable resistor and said contacts in series with the primary winding of said coil, a visible spark gap, and means for connecting said spark gap directly across said secondary winding.

2. In an apparatus for testing magneto ignition systems of the type having primary and secondary windings, a pair of breaker points and a capacitor, means for testing the resistance of the secondary winding comprising a source of energy, a current measuring device, a resistor, and switch means for selectively establishing a series circuit including said source, said device, said resistor and said secondary winding, said resistor having a variable portion and a fixed portion.

3. In an apparatus for testing magneto ignition systems of the type having a frame and primary and secondary windings, both terminals of said primary winding being disconnected from said frame, means for testing the resistance between the primary winding and the frame comprising a source of energy, a current-measuring device, a resistor, and switch means for establishing a series circuit including said primary winding, said source, said device, said resistor, said frame and the resistance between said primary winding and said frame.

4. In an apparatus for testing magneto ignition systems of the type having primary and secondary windings, a pair of breaker points and a capacitor, means for testing the leakage and capacity of said capacitor comprising a source, a current measuring device, a resistor, a first switch for establishing a series circuit comprising said source, said resistor, said capacitor and said device and a second normally closed switch connected directly in shunt of said capacitor and opened only in response to the exertion of a continuing actuating force and effective when released to directly and substantially instantaneously discharge said capacitor.

5. In an apparatus for testing magneto ignition systems of the type having primary and secondary windings, a pair of breaker points and a capacitor, the combination of a source of energy, a current measuring device, a resistor, and first and second switch means for establishing a series circuit comprising said source, said resistor, said capacitor and said device, one of said switch means comprising a normally open contact in said series circuit and a normally closed contact serving as a discharge path for said capacitor, said one of said switch means being operable to close said normally open contact and to open said normally closed contact only in response to the exertion of a continuing actuating force.

6. In an apparatus for testing magneto ignition systems of the type having primary and secondary windings, a pair of breaker points and a capacitor, the combination of a source of energy, a current measuring device, continuously variable resistance means for adjusting the current through said primary winding, a pair of periodically opening contacts, circuit means connecting said source of energy, said device and said contacts in series with the primary winding of said coil, a visible spark gap, means for connecting said spark gap directly across said secondary winding, a resistor, circuit means for connecting said source, said device and said resistor in series with one another and for connecting said breaker points in parallel with said device, and switch means for selectively and alternatively enabling said circuit means.

7. In an apparatus for testing magneto ignition systems of the type having primary and secondary windings, a pair of breaker points and a capacitor, means for testing the closed resistance of the breaker points and for testing the resistance of the secondary winding comprising a source of energy, a current measuring device, a first resistor, circuit means for establishing a series circuit including said source, said device and said resistor, a second resistor, circuit means for establishing a series circuit including said source, said device, said second resistor and said secondary winding, said second resistor having a variable portion and a fixed portion, and switch means for selectively and alternatively enabling said circuit means.

8. In an apparatus for testing magneto ignition systems of the type having primary and secondary windings, a pair of breaker points and a capacitor, the combination of a source of energy, a current measuring device, a first resistor, circuit means for connecting said source, said device and said resistor in series with one another and for connecting said breaker points in parallel with said device, a second resistor, first switch means, circuit means including said first switch means for establishing a series circuit comprising said source, said second resistor, said capacitor and said device, said first switch means comprising a normally open contact in said series circuit and a normally closed contact serving as a discharge path for said capacitor, said first switch means being operable to close said normally open contact and to open said normally closed contact only in response to the exertion of a continuing actuating force, and second switch means for selectively and alternatively enabling said circuit means.

9. In an apparatus for testing magneto ignition systems of the type having primary and secondary windings, a pair of breaker points and a capacitor, the combination of a source of alternating voltage, a current measuring device, a first resistor, circuit means establishing a series circuit including said source, said resistor and said capacitor, means for supplying to said device a direct current the amplitude of which varies as the amplitude of the alternating current in said series circuit, a second resistor, circuit means for establishing a series circuit comprising said source, said second resistor, said capacitor and said device, plural position switch means for selectively and alternatively enabling said circuit means, and an additional separately actuable switch connected directly in shunt of said capacitor and opened only during the exertion of a continuous force thereon.

References Cited in the file of this patent
UNITED STATES PATENTS

| | | |
|---|---|---|
| 1,950,052 | Haskins | Mar. 6, 1934 |
| 1,998,405 | Fernandez | Apr. 16, 1935 |
| 2,052,952 | Thomas | Sept. 1, 1936 |
| 2,108,637 | Bartgis | Feb. 15, 1938 |
| 2,257,958 | Holcombe | Oct. 7, 1941 |
| 2,271,292 | Fisher | Jan. 27, 1942 |
| 2,444,014 | Williams | June 22, 1948 |
| 2,573,208 | Logan | Oct. 30, 1951 |